Aug. 18, 1925. 1,550,014
G. C. DEBAY
BUILDING BLOCK MACHINE
Filed May 25, 1921 2 Sheets-Sheet 1
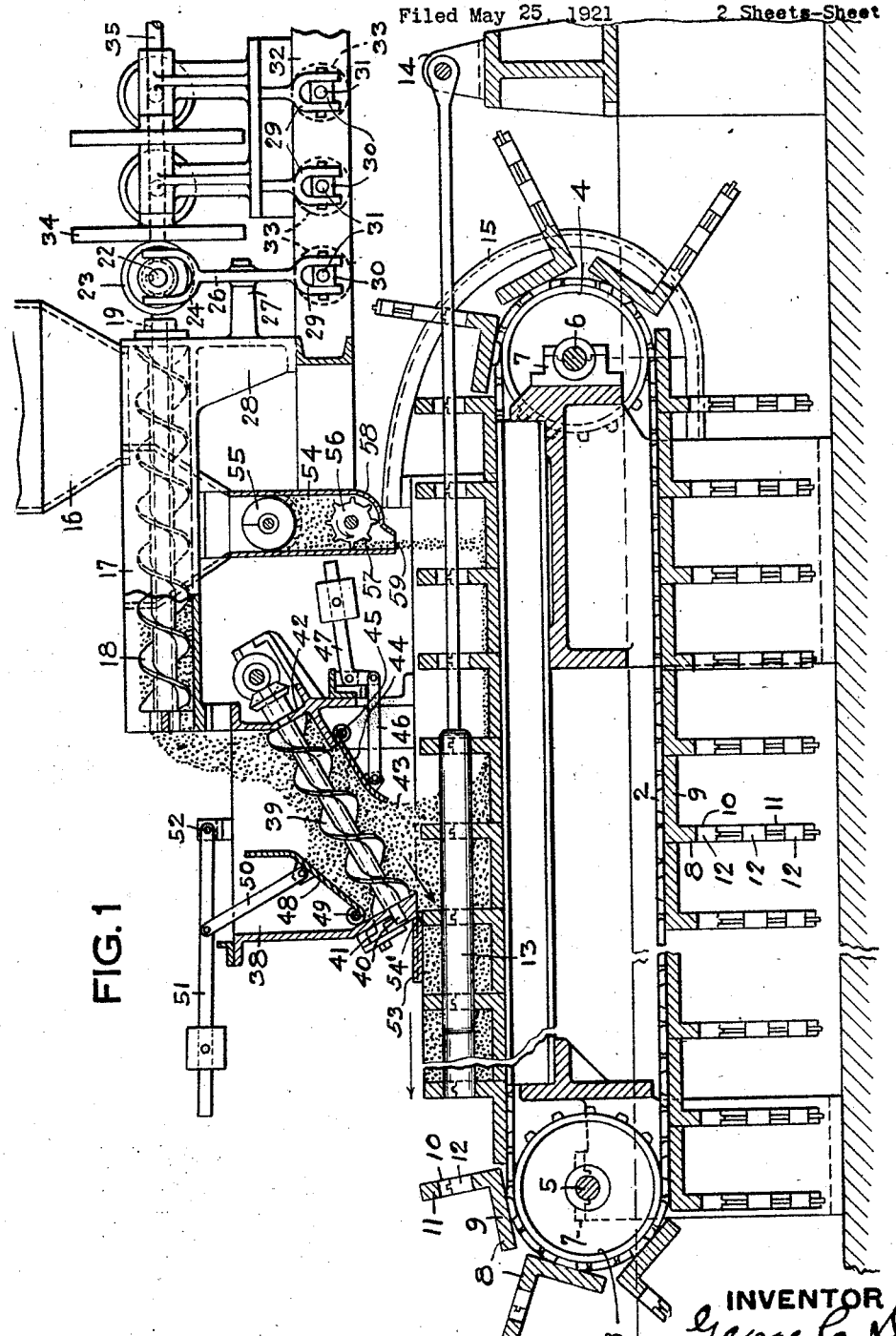
FIG.1
INVENTOR
George C. Debay Aug. 18, 1925.  
G. C. DEBAY  
BUILDING BLOCK MACHINE  
Filed May 25, 1921  
1,550,014  
2 Sheets-Sheet 2

INVENTOR  
George C. Debay  
By Kay Totten Brown  
attys

Patented Aug. 18, 1925.

1,550,014

UNITED STATES PATENT OFFICE.

GEORGE C. DEBAY, OF SPRINGDALE, PENNSYLVANIA.

BUILDING-BLOCK MACHINE.

Application filed May 25, 1921. Serial No. 472,317.

*To all whom it may concern:*

Be it known that I, GEORGE C. DEBAY, a citizen of the United States, and resident of Springdale, in the county of Allegheny and State of Pennsylvania, have invented a new and useful Improvement in Building-Block Machines; and I do hereby declare the following to be a full, clear, and exact description thereof.

My invention relates to a building block machine.

In Letters Patent of the United States No. 1,362,928, December 21, 1920, granted to me, I have illustrated and described a building block machine which comprises endless conveying mechanism, a stationary core bar, the molds carried by said endless conveyer consisting of mold members, each member forming the bottom and one side of the mold, the upper portion of the side of said mold member being formed of swinging sections with coinciding openings formed therein, whereby said sections may be swung into position over said core bar to enclose the same, together with means for delivering the material to the molds. The present invention has reference more particularly to the feeding of the material to the molds, although not limited to the feeding of molds of the construction of said patent, the object being to provide for the delivery of the material in such quantities and in such manner that the molds will be properly filled and the material compacted to form a solid block with clearly defined edges, while at the same time providing against the overcrowding of the mold and the choking up or clogging of the machine.

To these ends my invention comprises the novel features hereinafter set forth and claimed.

Figure 2:
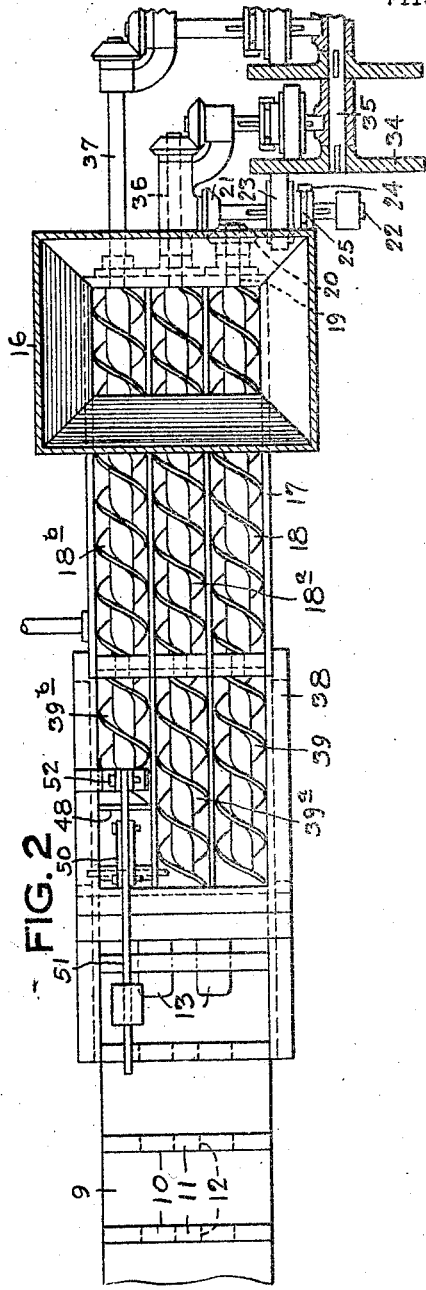
Figure 3:
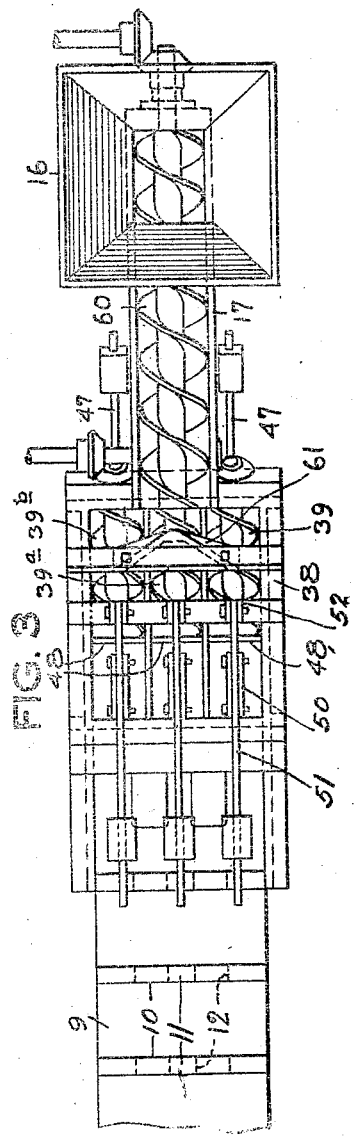

In the accompanying drawings, Fig. 1 is a side elevational section of my improved apparatus; Fig. 2 is a plan view; and Fig. 3 shows a modified form of my improved invention.

The numeral 2 designates a suitable endless conveyer mounted on the sprocket wheels 3 and 4, one of which is power driven, said sprocket wheels being mounted on the shafts 5 and 6 mounted in suitable bearings 7.

Connected to the endless conveyer 2 are the mold members 8 comprising the bottoms 9 and the sides 10, said sides having their upper portions formed of hinge sections 11 with coinciding openings 12 formed therein, so that said sections can fold over to encircle the stationary core bar 13 which is mounted on the standard 14, the hinge portions being moved over in position to engage the core by means of coming into contact with the guide bars 15, all as set forth and described in said Letters Patent before referred to, so that it has not been deemed necessary to illustrate and describe the same in detail.

The hopper 16 is provided into which the material for forming the blocks is delivered, and said hopper communicates with the trough 17 in which are the spiral conveyers 18, $18^a$ and $18^b$ which feed the material to the discharge end of said trough. In order to regulate the speed of the spiral conveyers 18, $18^a$ and $18^b$, said conveyers are provided with independent speed controls. The shaft 19 of the spiral conveyer 18 has the bevel gear 20 which is engaged by the bevel gear 21 on the shaft 22. The wheel 23 has a feather and groove connection with the shaft 22 and is slidable thereon. A yoke 24 engages the groove 25 in the wheel 23, said yoke 24 being connected to the lever 26 which is pivotally mounted on the extension 27 of the frame 28. At the lower end of the lever 26 is the yoke 29 in which is mounted the threaded block 30. A screw 31 passes through the threaded opening in the block 30, and said screw is supported at its inner end on the beam 32. The screw 30 may be provided with a hand wheel 33.

The wheel 23 is adapted to engage the disc 34 mounted on the shaft 35 which is driven by any suitable power. It will be apparent from the above that by rotating the screw 31 the lever 26 will be moved so that the wheel 23 is moved on the shaft 22 to move said wheel toward and from the center of the disc 34, whereby the speed of the shaft 19 of the spiral conveyer 18 may be controlled.

In the same manner the shafts 36 and 37 of the spiral conveyers $18^a$ and $18^b$ may be controlled, and it is not necessary to repeat the description above set forth.

At the forward end of the trough 17 is the receptacle 38 in which are mounted the inclined spiral conveyers 39, $39^a$ and $39^b$, the conveyer shafts 40 having their bearings at the lower end in the angular plate 41 at the lower end of the receptacle 38 and journaled at their upper ends in the plate 42 of said receptacle.

The receptacle 38 has the discharge opening 43, and adjacent said discharge opening are the yieldingly mounted plates 44, one for each conveyer, which are hinged at 45 to said receptacle. Bars 46 are pivotally connected to the swinging plates 44. The outer ends of said bars are pivotally connected to the weighted levers 47.

Within the receptacle 38 are the second set of yieldingly mounted plates 48, one for each spiral conveyer, said plates being hinged at 49 adjacent to the lower ends of the spiral conveyers, said yielding plates 48 acting to direct the material downwardly on to the conveyers. Bars 50 are pivotally connected to the plates 48 and to weighted levers 51 pivotally mounted at 52 on the receptacle 38.

Beyond the plate 41 is the horizontal troweling plate 53 which has the inner beveled edge 54.

It is often desirable to put a facing of granite or other material on blocks of this character and to provide for this the chute 54 is employed to which the pulverized granite is delivered by the spiral conveyer 55. A measuring roll 56 is arranged at the lower end of the chute 54 which limits the amount of material which can be delivered to the mold, as clearly indicated in Fig. 1. This roll is provided with the ribs 57 which move in close relation to the walls of said chute, said chute being curved at its lower end as at 58 and provided with the contracted outlet 59.

In the operation of the machine, the material from which the blocks are to be formed, such as composition of granulated slag and cement with sufficient water to cause adhesion, is delivered to the hopper 16 and is moved along the trough 17 by the spiral conveyers 18, 18$^a$ and 18$^b$. The material is discharged from the trough 17 into the receptacle 38 and with the spiral conveyers 39 in operation the material is forced out through the discharge opening 43 and delivered to the molds as they come into position with reference to said discharge opening. In case too much material is being fed to the molds and there is crowding or overloading, the yieldingly mounted plates 44 and 48 will yield to relieve such undue pressure, and as there are individual plates for each conveyer independent control is provided for each conveyer, so that an even discharge and distribution of the material is effected, and the strain on the parts, due to congestion or overcrowding is relieved, and just sufficient material is delivered to the molds to make a block of the proper density, and the material is packed around the core bars so that the block throughout is substantially of the same density. There are no cavities due to failure of the material to be delivered in proper quantities. As the mold reaches the inclined plate 41 the material which has been forced against said plate by the action of the conveyers is delivered to the mold with considerable force so that the material is compacted in the mold and the mold completely filled, and the further compacting and distribution of the material is effected by the troweling plate 53 with its beveled edge 54'.

It will be apparent that the discharge opening of the receptacle 38 is sufficiently large that a portion of the material is fed into the mold succeeding the mold which is being filled by the direct action of the spiral conveyers, so that in this way a certain amount of material can be fed to the succeeding mold before it gets into position for final filling.

In Fig. 3 I have shown a modified form of my invention where, instead of using three spiral conveyers in the trough 17, I employ but one spiral conveyer 60, and in order to deliver the material properly to the receptacle 38 I employ the baffle 61 which is angular in form, so that portions of the material will be delivered to the outer spiral conveyers, and a portion of it will be permitted to fall directly into the central spiral conveyer.

By providing means for independently controlling the speed of the spiral conveyers 18$^a$ and 18$^b$, if it is found that one conveyer is delivering more than the others, this may be corrected by turning one of the hand wheels 33 to operate the lever 26 to move one of the wheels 23 with reference to the friction disc 34, to reduce the speed of the shaft of the spiral conveyer which is delivering too much material, or vice versa.

What I claim is:

1. In a block molding machine, the combination of a traveling mold, an inclined chute communicating with said mold, an inclined spiral conveyer in said chute, and yielding means fore and aft to relieve the pressure of the material in the said mold.

2. In a block molding machine, the combination of a traveling mold, an inclined chute communicating with the said mold, an inclined spiral conveyer in the said chute, and a yieldingly mounted plate in said chute at the discharge end thereof, whereby the pressure of the material in said mold is relieved.

3. In a block molding machine, the combination of a traveling mold, an inclined chute communicating with the said mold, an inclined spiral conveyer in said chute, and a yieldingly mounted plate in the rear of said chute and forming one wall of the discharge end thereof, whereby the pressure of the material in said mold is relieved.

4. In a block molding machine, the combination of a traveling mold, an inclined chute communicating at one end with the said mold, an inclined spiral conveyer in said chute, a yieldingly mounted plate in said chute at a point substantially opposite to said point of communication, a weighted lever and connections between said plate and said lever.

5. In a block molding machine, the combination of a traveling mold, an inclined chute inclined downwardly toward the said mold and communicating therewith, an inclined spiral conveyer in said chute, and an inclined distributing plate at the lower end of the chute in which said spiral conveyer is journalled.

6. In a block molding machine, the combination of a traveling mold and communicating therewith, an inclined chute inclined downwardly toward the said mold, an inclined spiral conveyer in said chute, an inclined distributing plate at the lower end of said chute in which said spiral conveyer is journalled, and a troweling plate beyond said distributing plate.

7. In a block molding machine, the combination of a traveling mold, an inclined chute inclined downwardly toward the said mold and communicating therewith, an inclined spiral conveyer in said chute, an inclined distributing plate at the lower end of said chute in which said spiral conveyer is journalled, and a troweling plate beyond said distributing plate, having a front beveled edge.

8. In a block molding machine, the combination of a traveling mold, an inclined chute inclined downwardly toward the said mold and communicating therewith, an inclined spiral conveyer in said chute, an inclined distributing plate at the lower end of said chute in which said spiral conveyer is journalled, and a yieldingly mounted plate adjacent said distributing plate.

9. In a block molding machine, the combination of a plurality of traveling molds, a chute inclined downwardly toward the said molds and communicating with a plurality of longitudinally spaced molds at one time, and an inclined spiral conveyer in said chute.

10. In a block molding machine, the combination of a traveling mold, an inclined chute communicating with the said mold, a plurality of inclined spiral conveyers in said chute, and individual yielding means at each conveyer for relieving the pressure of the material in the said mold.

11. In a block molding machine, the combination of a traveling mold, an inclined chute inclined downwardly toward the said mold and communicating therewith, a plurality of inclined spiral conveyers in said chute, and yieldingly mounted plates one for each conveyer for relieving the pressure of the material in said mold.

12. In a block molding machine, the combination of a traveling mold, an inclined chute communicating with said mold, a plurality of inclined spiral conveyers in said chute, a trough above said chute, a plurality of spiral conveyers in said trough, and independent means for controlling the speed of rotation of each of said last named conveyers.

13. In a block molding machine, the combination of a traveling mold, a chute for containing facing material arranged in position over said mold, said chute having a flat wall and a contracted outlet, and a measuring roll having ribs thereon moving in close relation to said wall of said chute, whereby measured quantities of facing material are delivered therefrom in a substantially continuous stream, and means beyond said chute for delivering material for forming a block.

14. In a block molding machine, the combination of a continuously traveling mold, a chute arranged above said mold for containing a facing material, said chute having a flat vertical wall and a contracted outlet and a measuring roll having ribs thereon moving in close relation to said wall of said chute, and means beyond said chute for delivering material for forming the block.

In testimony whereof, I, the said GEORGE C. DEBAY, have hereunto set my hand.

GEORGE C. DEBAY.